United States Patent [19]

Malick

[11] Patent Number: 4,669,694
[45] Date of Patent: Jun. 2, 1987

[54] TILT ADJUSTING MECHANISM

[75] Inventor: Robert G. Malick, Batavia, Ill.

[73] Assignee: American Telephone and Telegraph Company, AT&T Bell Laboratories, Murray Hill, N.J.

[21] Appl. No.: 812,268

[22] Filed: Dec. 23, 1985

[51] Int. Cl.$^4$ ............................................. F16M 11/10
[52] U.S. Cl. ..................................... 248/397; 248/456; 248/130; 248/1
[58] Field of Search ............... 248/397, 456, 130, 455, 248/291, 185, 1 H, 1 I, 1 E, 1 A

[56] References Cited

U.S. PATENT DOCUMENTS

| | | | |
|---|---|---|---|
| 327,895 | 10/1885 | Noble | 248/185 X |
| 602,736 | 4/1898 | Duboeay | 248/456 |
| 1,855,964 | 4/1932 | Higginbotham | 248/185 X |
| 4,471,931 | 9/1984 | Covey et al. | 248/125 |
| 4,527,766 | 7/1985 | Krenz | 248/371 |

FOREIGN PATENT DOCUMENTS 1299882 12/1972 United Kingdom ................ 248/184

*Primary Examiner*—Ramon S. Britts
*Assistant Examiner*—Karen J. Chotkowski
*Attorney, Agent, or Firm*—Peter Visserman

[57] ABSTRACT

Apparatus for adjusting the tilt angle of a flat display panel, such as a plasma panel, includes a strut and a rotatable stop member engaging one end of the strut. The strut has one end pivotally attached to a vertically extending support member which supports the display panel housing by means of a hinge attached to the back wall of the housing. The other end of the strut extends through an elongated slot extending generally in the vertical direction in the back wall of the housing and engages the rotatable stop member mounted on the back wall opposite the slot. The stop member has a smooth surface and a frictional surface provided with a number of detents. A lever attached to a shaft portion of the rotatable stop member extending below the bottom wall of the housing facilitates rotation of the stop to a position in which the strut is in sliding engagement with the smooth surface, allowing free adjustment of the tilt angle of the panel. A bias spring is biased to return the stop to a locking position in which the detents of the frictional surface engage the strut to hold the panel in a fixed tilt angle position.

11 Claims, 4 Drawing Figures

TILT ADJUSTING MECHANISM

TECHNICAL FIELD

The invention relates to an adjustable support for a visual display terminal and, more particularly, to apparatus for controlling the tilt angle of a visual display terminal.

BACKGROUND OF THE INVENTION

With the explosive increase in computer use, both in the home and in the office, visual display terminals are used by many different people in a variety of environments. One problem encountered by users reading the displays from different angles and in different lighting conditions is the difficulty of appropriately positioning the face of the display terminal for ease of reading. A number of mounting mechanisms have been developed for adjusting the position of relatively large and bulky display terminals such as cathode ray tube terminals. However, advances in technology allow the bulky cathode ray tube to be replaced by devices which are much lighter and require less space, such as plasma display devices. The plasma and other flat devices may be installed in a housing unit which is essentially flat and does not have the weight distribution normally found in a cathode ray tube display device. Consequently, the various mounting devices devised for cathode ray tube structures provide no benefit for positioning of the flat devices.

It is an object of this present invention to provide a tilt adjusting mechanism for a relatively flat display device which allows the face of the display device to be conveniently set to any of a number of tilt angles.

SUMMARY OF THE INVENTION

In accordance with the present invention, a tilt mechanism for adjusting the tilt angle of a display terminal comprises an elongated rotatable stop member mounted on the housing of the terminal and extending generally in the vertical direction, and a strut member having one end pivotally attached to a vertical support member pivotably, or movably, supporting the terminal housing and having a free end resting against the rotatable stop member which is provided with a first surface and a second surface. A lever is provided for rotating the stop member to one position in which the free end of the strut is slidingly engaged by the first surface and to another position in which the free end of the strut is substantially fixedly engaged by the second surface to prevent sliding motion of the free end of the strut on the stop member. Advantageously, a display panel may be enabled to move, with respect to its vertical support member, to any desired tilt position along an arcuate path by turning the stop member to one position in which the strut is slidingly engaged with a first smooth surface, and any desired tilt angle so achieved may be retained by turning the stop member to another position in which a second frictional surface engages the strut.

In one embodiment of the invention, a display device is mounted in a housing comprising a back wall defining an elongated slot extending substantially in the vertical direction. The housing is attached by a hinge mechanism to a vertical support member. A rotatable stop member having a smooth surface and a frictional surface defining a number of detents is mounted inside the housing opposite the slot and extending along the length of the slot. A strut which is pivotally attached to the vertical support member at one end, extends through the slot and rests against the rotatable stop member. The rotatable stop member includes a shaft which extends below the bottom of the housing and a lever attached to the shaft facilitates turning of the rotatable stop member for enabling and disabling tilt angle adjustment. A bias spring returns the rotatable stop member to a locking position in which the frictional surface engages the strut.

Advantageously, the tilt adjusting mechanism of the invention provides fast and easy fingertip control of the tilt angle of a display panel to almost any desired position.

BRIEF DESCRIPTION OF THE DRAWING

The invention may be better understood from the following detail description when read in conjunction with the accompanying drawing in which.

DETAILED DESCRIPTION

Figure 1:
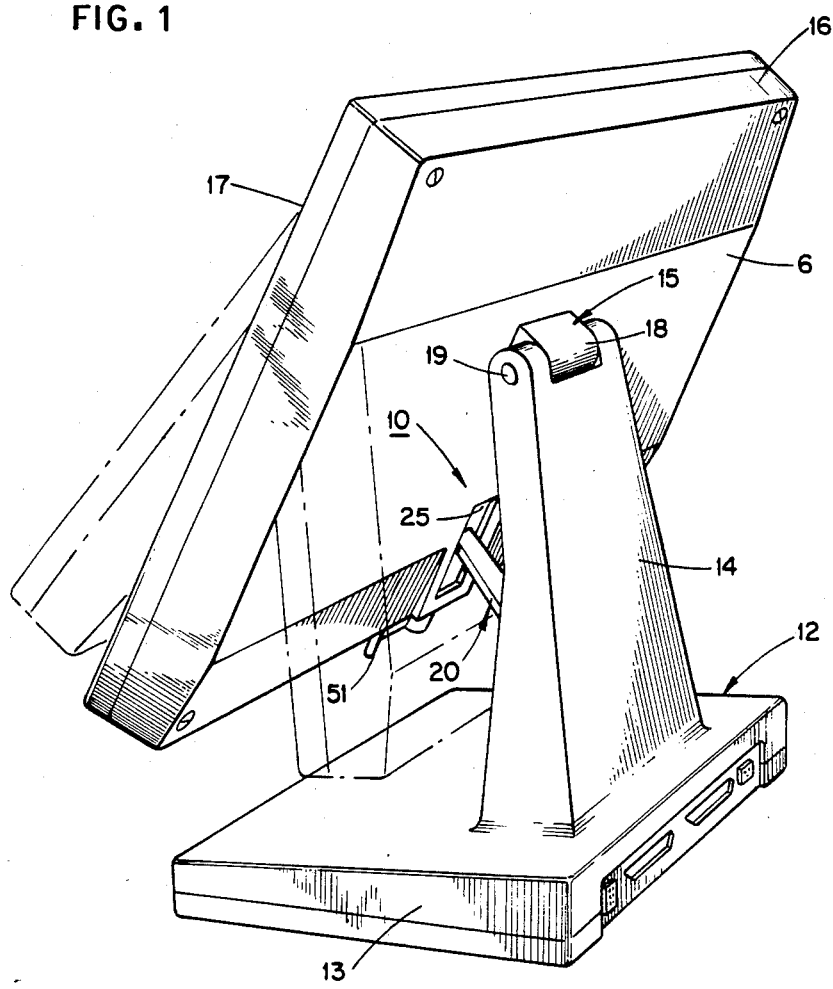
FIG. 1 is a rear perspective view of a flat display terminal support utilizing the tilt adjusting mechanism of this invention.

FIG. 1 shows a tiltable display unit housing 16 attached by means of a hinge arrangement 15 to a base unit 12 and tilting apparatus 10 for controlling the tilt angle of the housing 16. The base unit 12 comprises a vertically extending support member 14 and a base unit housing 13 extending generally horizontally. The housing 13 provides support for the vertical member 14 and an enclosure for electronic components. The display unit housing 16 supports a flat display 17 and encloses associated electronic components. A hinge member 18 which is attached to the back wall 6 of housing 16 pivots on a hinge pin 19 of hinge arrangement 15. A tilt adjusting apparatus 10 includes a strut 20 extending from the vertical support member 14 through slot 25 in the back wall 6 of housing 16. The strut 20 may be released from a fixed position in the slot 25 by operation of lever 51, thereby allowing the housing 16 to be tilted about the hinge pin 19. This allows the display unit housing 16 to be tilted forward or backward about the horizontal axis of the hinge arrangement 15. The limits of forward and backward tilt of this exemplary embodiment of the invention, 5 degrees forward and 20 degrees backward, are shown by the phantom lines in FIG. 1. A user may adjust the tilt angle of the display unit housing 16 to almost any desired angle within these limits through the operation of the tilting apparatus 10.

Figure 2:
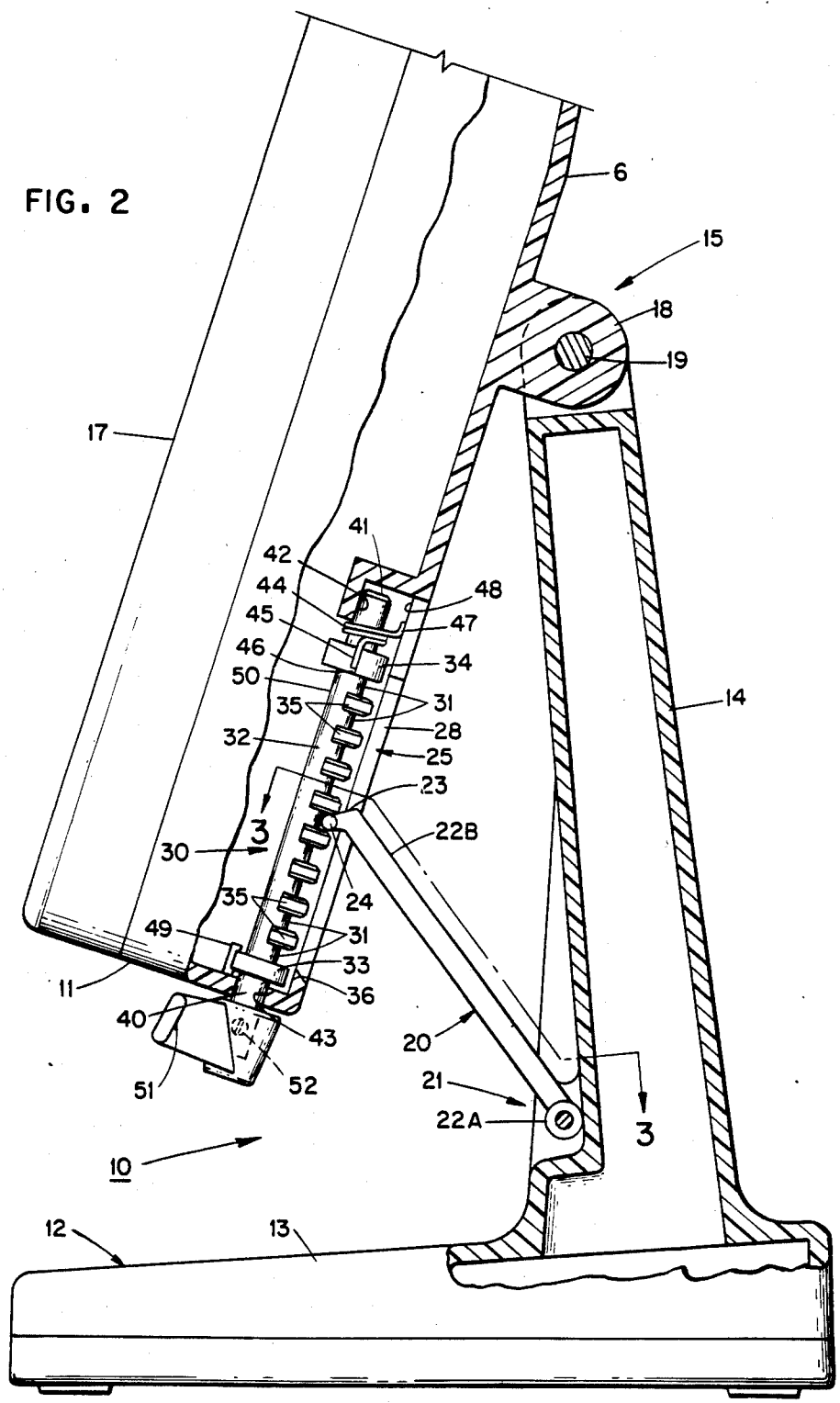
FIG. 2 is a side sectional view of the display terminal support depicted in FIG. 1, showing in greater detail a rotatable stop member of the tilt adjusting mechanism of FIG. 1.

FIG. 2 shows the tilting apparatus 10 in greater detail. The strut 20 has a hinged end 22A attached by means of a hinge assembly 21 to the lower portion of the support 14. A free end 22B of the strut 20 extends through slot 25 in the back wall 6 of display housing 16 and is provided with ridge 24 which engages a rotatable stop 30. The rotatable stop 30 is mounted on the back wall 6 along the slot 25 and has a frictional surface having a number of detents 31 and a smooth surface 50.

The rotatable stop 30 may be turned to an adjusting position (shown in FIG. 4) in which the smooth surface 50 is in sliding engagement with ridge 24 of the strut 20 allowing the strut to move in slot 25 substantially in the vertical direction. Consequently, the display housing 16 may be moved along an arcuate path about the hinge 15 to any desired tilt angle position. The rotatable stop 30 may also be turned to a locking position (shown in FIG. 3) in which the ridge 24 engages the frictional surface detents 31 to prevent any sliding motion of the strut 20 with respect to the stop 30, thereby locking the housing 16 at an established tilt angle. For ease of tilt angle adjustment, when the stop is in the adjusting position, the strut pivot 21 is located at a point which is below the bottom edge 36 of slot 25, in all positions of the housing 16.

The rotatable stop 30 comprises a shaft 32 having a collar 33 near its lower end 40 and a collar 34 near its upper end 41. The two collars 33 and 34 and a plurality of dovetail shaped members 35 juxtaposed therebetween define the detents 31. The stop 30 is held within the back of the display housing 16 at its lower end 40 in a hole 43 in the bottom wall of the housing 16 and at its upper end 41 in a cavity 42 integral with the back wall 6 of the display housing 16. The shaft 32 extends through the hole 43 beyond the bottom wall of housing 16, and lever 51 is fastened to the part of the shaft extending beyond the bottom wall by means of a set screw 52. The lever 51 may be operated by a user to rotate the stop 30 between a locking position in which the ridge 24 of strut 20 is retained in one of the detents 31, and the adjusting position in which the ridge 24 is allowed to slide along the smooth surface 50. A helical bias spring 44 is attached to the upper end 41 of shaft 32 and tends to turn the shaft to the locking position. One end 45 of bias spring 44 is inserted in a slot 46 of the upper shaft collar 34 and the other end 47 of the spring 44 extends beyond side edge 28 of the slot 25 and presses against the inside surface of back wall 6 of display housing 16. A stop pin 49 inserted in the bottom wall 11 of the housing 16 in a detent of lower shaft collar 33 limits the rotational travel of the rotatable stop 30.

In FIG. 2, the adjustable tilting mechanism 10 is shown in an intermediate position. In order for a user to change the tilt of the display unit 11 from the position shown, he or she may pull lever 51 forward, thus turning rotatable stop 30 approximately one quarter of a turn and expanding bias spring 44. In that position, the dovetail members 35 are rotated away from the ridge 24 of strut 20, exposing the smooth, unobstructed surface 50 for sliding engagement with the ridge 24. This allows the display housing 16 to be tilted either backward or forward, as the ridge 24 of strut 20 is free to travel in the vertical direction, up or down, along the length of the smooth surface 50 of rotatable stop 30. When the desired position has been reached, the user releases the lever, causing the rotatable stop 30 to be returned to the locking position by the bias spring 44.

Figure 3:
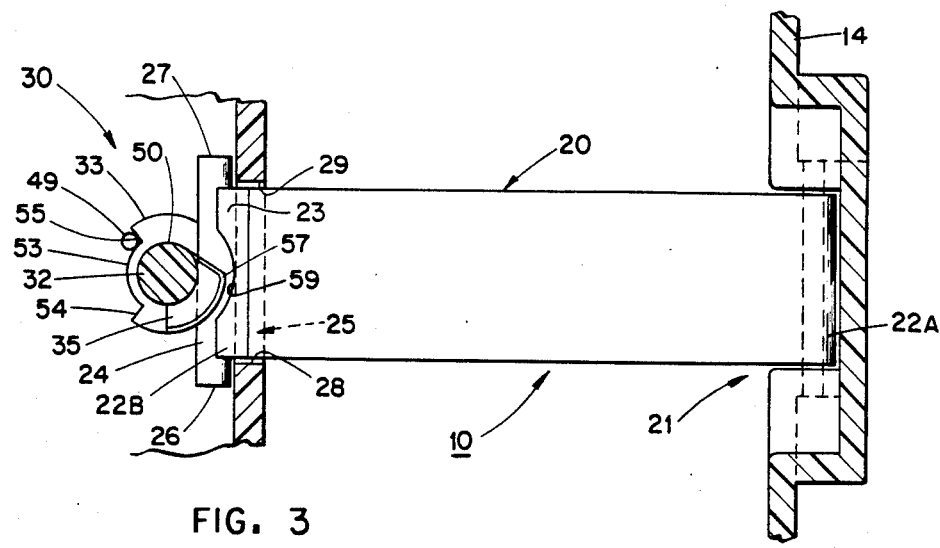
FIG. 3 is a sectional view along the line 3—3 in FIG. 2, showing the rotatably stop member in one orientation; an FIG 4 is a sectional view along the line 3—3 showing the rotatable stop member in another orientation.

FIG. 3 is a sectional view along line 3—3 of FIG. 2 and shows further detail of the strut 20 and rotatable stop 30. The ridge 24 comprises a pair of shoulders 26 and 27 extending outward from the sides of the strut 20 and beyond the side edges 28 and 29, respectively, of slot 25. The shoulders serve to prevent the strut 20 from being pulled out of slot 25 as the housing 16 is tilted. The ridge 24 is formed at the end of a strut extension section 23 extending at an angle toward the stop 30 to facilitate engagement with the stop 30. A cutout 59 is formed where the ridge 24 attaches to the strut to prevent the dovetail members 35 from jamming against the upper surface of the extension section 23 as the angle of the strut relative to the stop 30 changes with changes in the tilt angle of the housing 16.

Figure 4:
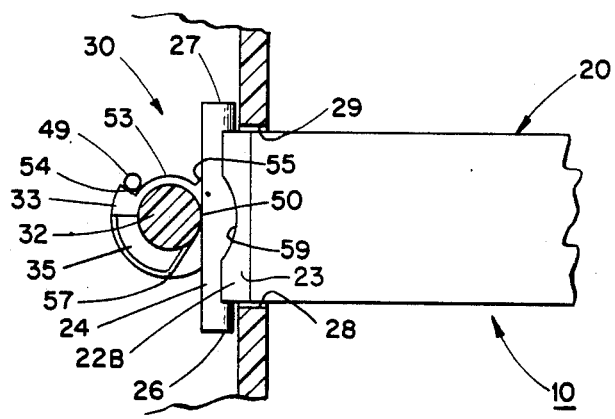

In FIG. 3 the rotatable stop is shown in the position in which the strut 20 is held in a locked position by dovetail members 35. FIG. 4 is a sectional view of the rotatable stop 30, turned approximately onefourth turn from the position shown in FIG. 3. In this position the ridge 24 of the strut 20 is in sliding engagement with the smooth surface 50 of the stop 30 and the strut 20 is allowed to move freely in the vertical direction along the length of the surface 50. As shown in FIGS. 3 and 4, the dovetail members 35 are provided with a chamfered leading edge 57. This facilitates engagement of the ridge 24 in the detents 31. Also shown is the detent 53 in the lower shaft collar 33 for the stop pin 49. When the rotatable stop member is rotated toward the adjusting position shown in FIG. 4, surface 54 of detent 53 will engage stop pin 49 to limit the rotational travel. When the rotatable stop member 30 is returned to the position shown in FIG. 3, the surface 55 engages pin 49 to limit travel in that direction. It will be apparent to those skilled in the art that the range of tilt angles of the housing 16 may be readily defined by proper selection of the length of the slot 25 and stop 30 as well as the length of strut 20.

What has been described is considered to be only one illustrative embodiment of the invention. Thus, it is to be understood that various and numerous other arrangements may be devised by one skilled in the art without departing from the spirit and scope of the invention. For example, although the rotatable member shown utilizes a rounded body with dovetail like members defining the detents, the rotatable member could be either rectangular or elliptical shaped with detents milled directly into the shaft. The invention is thus limited only as defined in the accompanying claims.

What is claimed is:

1. Apparatus for adjusting the tilt angle of a display terminal housing having a back wall pivotally attached to a vertically extending support member, said apparatus comprising an elongated rotatable stop member mounted on said housing and extending generally in the vertical direction and a strut member having an end pivotally attached to said support member and having a free end resting against said stop member, said rotatable stop member comprising a first surface and a second surface in a section of said member having a defined length in the direction of elongation of said stop member, both said surfaces extending over said defined length in the direction of elongation of said stop member, and means for rotating said stop member to one position in which said free end of said strut is engaged by said first surface to enable pivoting of the housing with respect to the support member and to another position in which said free end of said strut is substantially fixedly engaged by said second surface to retain the housing at a fixed tilt angle.

2. Apparatus for adjusting the tilt angle of a display terminal housing having a back wall pivotally attached to a vertically extending support member, said tilt adjusting mechanism comprising an elonged rotatable stop member mounted on said housing and extending generally in the vertical direction and a strut member having an end pivotally attached to said support member and having a free end resting against said stop member, said rotatable stop member having a sirst surface and a second surface extending in the direction of elongation of said stop member, said second surface comprising one or more detents for engaging said free end of said strut member and means for rotating said stop member to one position in which said free end of said strut is engaged by said first surface to enable pivoting of the housing with respect to the support member and to another position in which said free end of said strut is substantially fixedly engaged by said second surface to retain the housing at a fixed tilt angle.

3. An arrangement for tiltably supporting a display unit comprising:
 a base including a vertical support member extending substantially in the vertical direction and having an upper portion and a lower portion;
 a display unit support housing having a back wall extending in a direction generally oarallel to said vertical member and pivotally connected to said upper portion of said vertical member;
 a strut member having one end pivotally connected to said lower portion of said vertical member and having another end extending to said back wall; and
 a rotatable stop member mounted on said back wall, having a smooth surface and a frictional surface provided with a plurality of detents for engaging said other end of said strut member;
 said rotatable member being rotatable to a first position in which said frictional surface engages said other end of said strut for restricting movement of said other end of said strut in the vertical direction to prevent pivoting of the housing with respect to said support member and rotatable to a second position in which said smooth surface engages said other end of said strut to allow movement of said other end of said strut in a vertical direction for enabling pivoting of the housing with respect to the support member.

4. An arrangement for tiltably supporting a display unit comprising:
 a base including a vertical support member extending substantially in the vertical direction and having an upper portion and a lower portion;
 a display unit support housing having a back wall extending in a direction generally parallel to said vertical member and pivotally connected to said upper portion of said vertical member;
 a strut member having one end pivotally connected to said lower portion of said vertical member and having another end extending to said back wall; and
 a rotatable stop member mounted on said back wall, having a smooth surface and a frictional surface provided with a plurality of detents;
 said rotatable member being rotatable to a first position in which said frictional surface engages said other end of said strut for restricting movement of said other end of said strut in the vertical direction to prevent pivoting of the housing with respect to said support member and rotatable to a second position in which said smooth surface engages said other end of said strut to allow movement of said other end of said strut in a vertical direction for enabling pivoting of the housing with respect to the support member;
 said back wall including an elongated slot extending in a vertical direction and said rotatable member being mounted on said wall inside housing and positioned opposite said slot and extending along the length of said slot in the vertical direction, said other end of said strut member extending through said slot to engage said rotatable member.

5. The arrangement in accordance with claim 4 wherein said slot has a defined bottom edge and said strut is attached to said vertical member at a position no higher than the bottom edge of said slot in said back wall.

6. The arrangement in accordance with claim 4 wherein said slot comprises side edges extending generally in the vertical direction and wherein said other end of said strut comprises a horizontally extending ridge including a pair of shoulders extending horizontally beyond said side edges of said slot, to prevent said strut from moving out of said slot when said back wall is pivoted so as to move the lower portion of the back wall away from the vertical member.

7. The arrangement of claim 3 wherein said display unit support housing has a bottom wall and said rotatable member comprises a shaft extending through said bottom wall and a lever attached to said shaft to facilitate rotating said rotatable member between said first position and said second position.

8. An arrangement for tiltably supporting a display unit comprising:
 a base including a vertical support member extending substantially in the vertical direction and having an upper portion and a lower portion;
 a display unit support housing having a back wall extending in a direction generally parallel to said vertical member and pivotally connected to said upper portion of said vertical member;
 a strut member having one end pivotally connected to said lower portion of said vertical member and having another end extending to said back wall;
 a rotatable stop member mounted on said back wall, having a smooth surface and a frictional surface provided with a plurality of detents;
 said rotatable member being rotatable to a first position in which said frictional surface engages said other end of said strut for restricting movement of said other end of said strut in the vertical direction to prevent pivoting of the housing with respect to said support member and rotatable to a second position in which said smooth surface engages said other end of said strut to allow movement of said other end of said strut in a vertical direction for enabling pivoting of the housing with respect to the support member; and
 a bias spring attached to said rotatable member tending to return said rotatable member to said first position.

9. An arrangement for tiltably supporting a display unit comprising:
 a base including a vertical support member extending substantially in the vertical direction and having an upper portion and a lower portion;
 a display unit support housing having a back wall extending in a direction generally parallel to said vertical member and pivotally connected to said upper portion of said vertical member;
 a strut member having one end pivotally connected to said lower portion of said vertical member and having another end extending to said back wall;
 a rotatable shaft mounted on said back wall, having a smooth surface and a frictional surface provided with a plurality of detents formed between a plurality of spaced apart dovetail members attached to said shaft;

said other end of said strut including an angular end piece for engagement with said stop member and extending toward said stop member and including a ridge formed on said angular end piece for insertion in said detents;

said shaft being rotatable to a first position in which said frictional surface engages said other end of said strut for restricting movement of said other end of said strut in the vertical direction to prevent pivoting of the housing with respect to said shaft and rotatable to a second possition in which said smooth surface engages said other end of said strut to allow movement of said other end of said strut in a vertical direction for enabling pivoting of the housing with respect to said shaft.

10. A tilt adjusing mechanism for adjusting the tilt angle of a panel having a back wall pivotally attached to a support member having an upper section and a lower section, said panel being attached to said upper section, said tilt adjusting mechanism comprising:

a strut member having one end pivotally attached to said lower section of said support member and having another end extending toward said panel; and a rotatable member having an axis of rotation mounted on said back wall and extending generally in the vertical direction and positioned to engage said other end of said strut;

said rotatable member having a frictional surface and a smooth surface in a section of said member having a defined length, both said surfaces extending in the direction of said axis of rotation over said defined length;

said rotatable member rotatable to a first position in which said frictional surface engages said other end of said strut member to retain said other end of said strut in a fixed position, and rotatable to a second position in which said smooth surface engages said other end of said strut member to allow sliding motion of said other end of said strut along said smooth surface;

whereby said panel is locked in position when said rotatable member is in said first position and is allowed to tilt along an arcuate path when said rotatable member is in said second position.

11. Apparatus for adjusting the tilt angle of a display terminal housing having a back wall attached to a vertically extending support base by an upper hinge mechanism and having an elongated slot defined therein extending substantially in the vertical direction, said tilt adjusting mechanism comprising:

a strut member having one end pivotally attached to said support base at a point below said upper hinge mechanism and having another end extending through said slot, and a rotatable stop member mounted in said housing and extending along the length of said slot for engaging said other end of said strut member;

said rotatable stop member having a first smooth surface for slidably engaging said other end of said strut member to allow movement of said other end of said strut member in the direction of elongation of said slot, and a frictional surface having indentations defined therein for engaging said other end of said strut member to prevent movement of said other end of said strut member in said slot.

* * * * *

UNITED STATES PATENT AND TRADEMARK OFFICE
CERTIFICATE OF CORRECTION

PATENT NO. : 4,669,694

DATED : June 2, 1987

INVENTOR(S) : Robert G. Malick

It is certified that error appears in the above-identified patent and that said Letters Patent is hereby corrected as shown below:

IN THE CLAIMS

Column 4, line 64, "elonged" should be "elongated";
Column 5, line 1, "sirst" should be "first";
Column 5, line 18, "oarallel" should be "parallel";
Column 5, line 51, delete the colon and substitute a semi-colon;
Column 6, line 1, after "inside" insert --said--;
Column 7, line 20, "adjusing" should be "adjusting".

Signed and Sealed this

Twenty-third Day of April, 1991

Attest:

HARRY F. MANBECK, JR.

Attesting Officer

Commissioner of Patents and Trademarks